United States Patent
Mansoorian et al.

(10) Patent No.: US 9,357,149 B2
(45) Date of Patent: May 31, 2016

(54) STITCHED IMAGE SENSOR WITH MULTIPLE PART DRIVERS

(71) Applicants: Barmak Mansoorian, Pasadena, CA (US); Daniel vanBlerkom, Pasadena, CA (US); Loc Truong, Pasadena, CA (US); David Estrada, Pasadena, CA (US)

(72) Inventors: Barmak Mansoorian, Pasadena, CA (US); Daniel vanBlerkom, Pasadena, CA (US); Loc Truong, Pasadena, CA (US); David Estrada, Pasadena, CA (US)

(73) Assignee: Forza Silicon Corporation, Pasadena, CA (US)

( * ) Notice: Subject to any disclaimer, the term of this patent is extended or adjusted under 35 U.S.C. 154(b) by 161 days.

(21) Appl. No.: 13/949,183

(22) Filed: Jul. 23, 2013

(65) Prior Publication Data

US 2014/0027615 A1    Jan. 30, 2014

Related U.S. Application Data

(60) Provisional application No. 61/675,226, filed on Jul. 24, 2012.

(51) Int. Cl.
| | |
|---|---|
| *H04N 5/376* | (2011.01) |
| *H04N 5/222* | (2006.01) |
| *H04N 5/225* | (2006.01) |
| *H04N 5/247* | (2006.01) |

(52) U.S. Cl.
CPC ............... *H04N 5/376* (2013.01); *H04N 5/222* (2013.01); *H04N 5/2251* (2013.01); *H04N 5/247* (2013.01)

(58) Field of Classification Search
CPC combination set(s) only.
See application file for complete search history.

(56) References Cited

U.S. PATENT DOCUMENTS

2007/0040786 A1 * 2/2007 Chung ........................... 345/92

OTHER PUBLICATIONS

Very Large-area CCD image sensors: concept and cost-effective research, SPIE Electronic Imaging 2009, Paper 7250-39.*

* cited by examiner

*Primary Examiner* — Francis M Legasse, Jr.
(74) *Attorney, Agent, or Firm* — Law Office of Scott C Harris, Inc

(57) ABSTRACT

An image sensor system has a first stitched image sensor part that has multiple image sensing pixels and pixel gates. The multiple pixel gates are connected together by a first line on the first stitched image sensor part, and said multiple pixel gates are controlled by a first control signal. A second stitched image sensor part also has multiple sensing pixels and pixel gates, and the multiple pixel gates are connected together by a second line on said second stitched image sensor part, and said multiple pixel gates on said second stitched image sensor part are controlled by the first control signal. A driver for the first control signal, wherein said driver includes a first part for controlling said multiple pixel gates of said first stitched image sensor part and said driver has a second part, also driven by the same first control signal, for controlling said multiple pixel gates of said second stitched image sensor part.

26 Claims, 3 Drawing Sheets

STITCHED IMAGE SENSOR WITH MULTIPLE PART DRIVERS

This application claims priority from Provisional application No. 61/675,226, filed Jul. 24, 2012, the entire contents of which are herewith incorporated by reference.

BACKGROUND

In large image sensors, there is a need to drive various control signals across the entire array. This can be especially true in stitched sensors that are stitched together from multiple parts.

These control signals drive loads that often include thousands of gate capacitances through resistive lines that can span tens of millimeters. FIG. 1 illustrates how the control signal shown generally as 100 is driven by a driver for example a buffer or follower, across the array shown generally as 120. The array includes lines shown as 125, which are shown as a resistance representing the inherent resistance of those lines. The array has thousands of gates each shown as 130 as a capacitance. The array also includes an inherent line capacitance 140, over its tens of millimeters of line space. This makes it very difficult and sometimes impossible to drive control signals 100, having to go from rail to rail (e.g. 0 V to the full level VCC) across the array with reasonable delay and rise/fall times.

SUMMARY

Techniques are described for driving control signals across an array, e.g. a large array with thousands of gate capacitances.

One embodiment describes a stitch image sensor where the control signals are driven across different areas of the sensor by individual repeaters in the different areas of the sensor, and each stitched area can define its own areas for the driving of signals.

DETAILED DESCRIPTION

Figure 1:
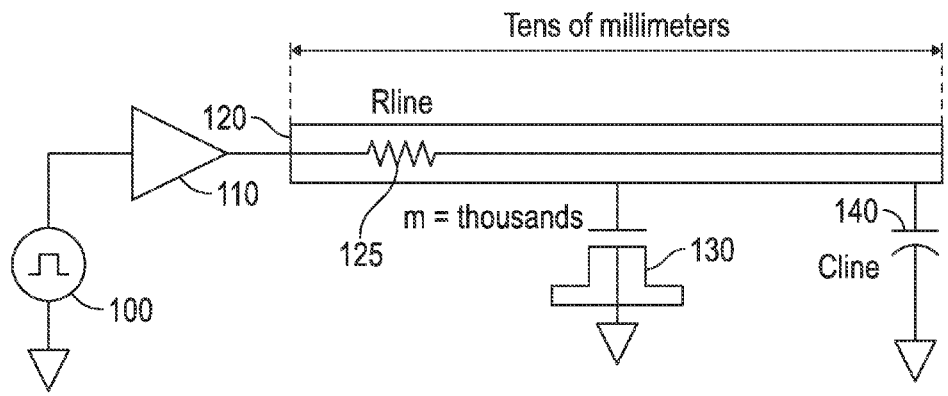
FIG. 1 shows a control signal being driven on one side of the array to thousands of gate connections.

In order to address the issue in driving control signals across such an array as shown in FIG. 1 the inventor found it useful to consider the types of control signals. These control signals are digital, and in general these digital signals can be thought of as either being row-based, or sub row-based.

Row-based signals in an image array are like readout controls, for example signals to sample the signal and sample the reset (sampsig, samprst). Other row-based signals include controls for selecting and resetting the pixel, such as (sel, rst, tx). These can last as long as hundreds of nanoseconds to several microseconds.

The sub-row signals like ADC control signals (pre, prst, latch) can be as short as 10-50 ns.

Row based signals can be readout control signals having a 1-D array structure. Row based signals can also be pixel control signals having a 2-D array structure that is they need to go in two directions across the array.

Figure 2:
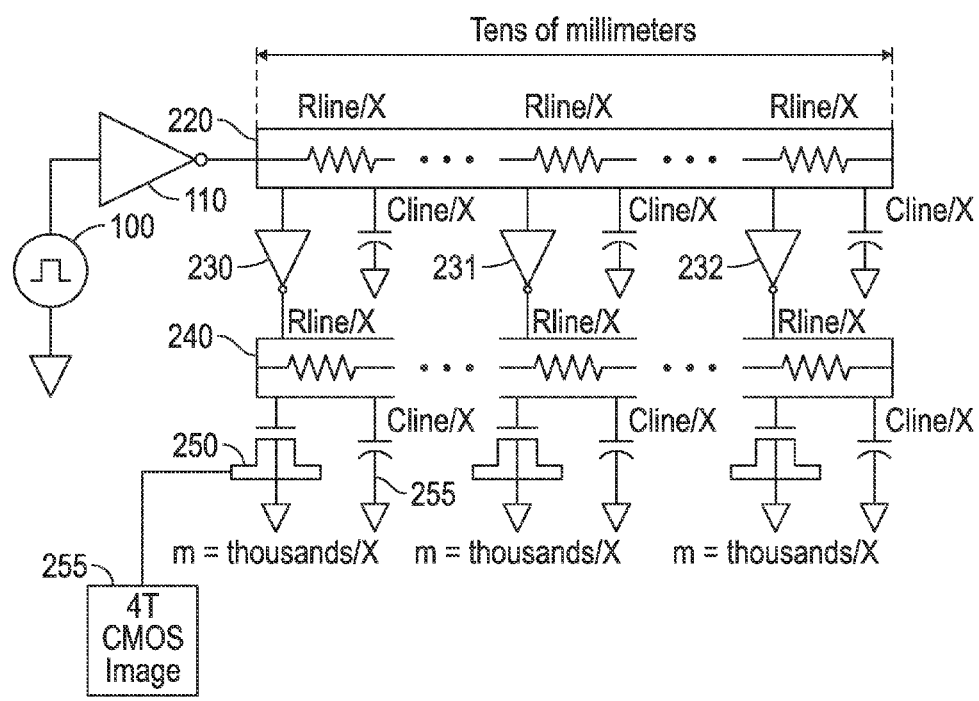
FIG. 2 shows a control signal being driven on one side of the array to thousands of gate connections.

To achieve reasonable delay and rise/fall times for those readout controls that have a 1 D array structure, FIG. 2 illustrates how the array can be segmented into smaller sections. The signal can be driven to a first line 220 that itself includes a number of buffers/drivers 230, 231, 232. Each buffer such as 230 drives its own line such as 240. The line 240 is 1/X the size of the line 120 in FIG. 1. Therefore, while the line 240 drives many different gates, this is thousands/x of gates shown as 250, with the line capacitance of line capacitance/x shown as 255. Therefore, this technique can divide the overall difficulty by x where x is the number of divided areas. FIG. 2 also illustrates how each gate such as 250 is actually a gate that is part of a 4 T CMOS image sensor. Each of the thousands of gates shown in FIG. 2 and in the other embodiments shown herein are similarly part of an image sensor, and more preferably a CMOS image sensor. The array in FIG. 2 has been broken up into X number of segments and an intermediate buffer is added at each segment to drive the reduced load, which is been cut by X amount.

Figure 3:
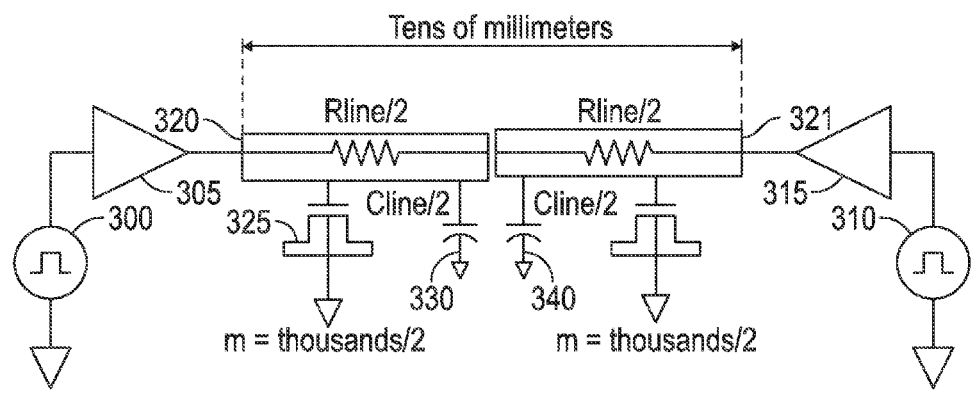
FIG. 3 shows a control signal being driven on both sides of an array driving two different lines that are disconnected at the middle of the array.

To get reasonable delay and rise/fall times for there are pixel control signals having a two-dimensional array structure, the flexibility of segmenting the array into smaller sections and adding segment wise buffering as shown in FIG. 1 may no longer be available due to the 2-D array nature. FIG. 3 shows an alternative that can be used for such a two-dimensional gate, where the single signaling driver is replaced by dual or more general multiple signals and drivers 300, 305 is a first one, 310, 315 has a second. The signal 300 drives the driver 305, to drive half the line shown as 320 in half the number of gates 325 and half line capacitance 330. There is also a cut in the middle shown as 340 between the line 320, and the alternate line 321 being driven by the buffer 315.

Figure 4:
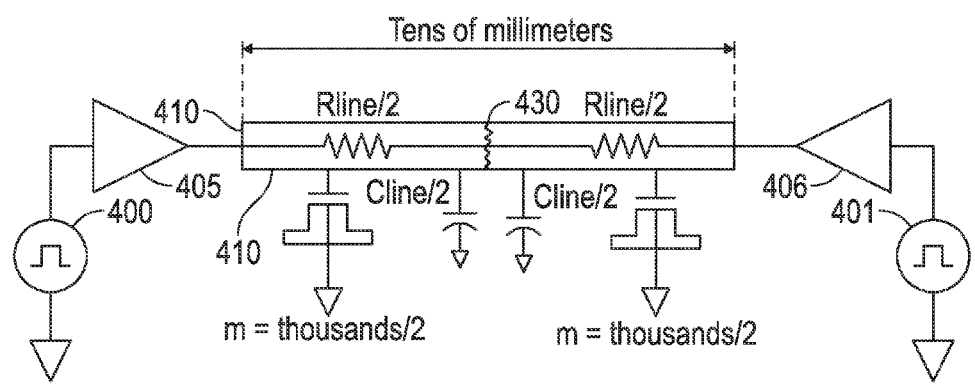
FIG. 4 shows a control signal being driven on both sides of an array driving two different lines that are connected at the middle of the array.

However, in a stitched design, segments are repeated and a cut in the middle is not possible. An embodiment describes using the area of the stitch in order to facilitate driving different portions of the driving line separately. In this embodiment, the area where the line is stitched together becomes a discontinuity. The signal is still driven from both sides in this embodiment. In case there is a mismatch in drive strength and/or delay between the two sides, there is enough resistance and capacitance in the line and load that there is little to no risk of the two buffers fighting one another causing large current glitches. FIG. 4 shows how this can be done in a stitched sensor, where the signals 400, 401 and drivers 405, 406 are slightly offset relative to one another. Even though there is one connected line 410, the offsets and inherent resistance and capacitance allow the signals to be driven from both sides. Note that the location 430 where the two areas are stitched together forms an inherent break between the 2 parts of the signal.

Figure 5:
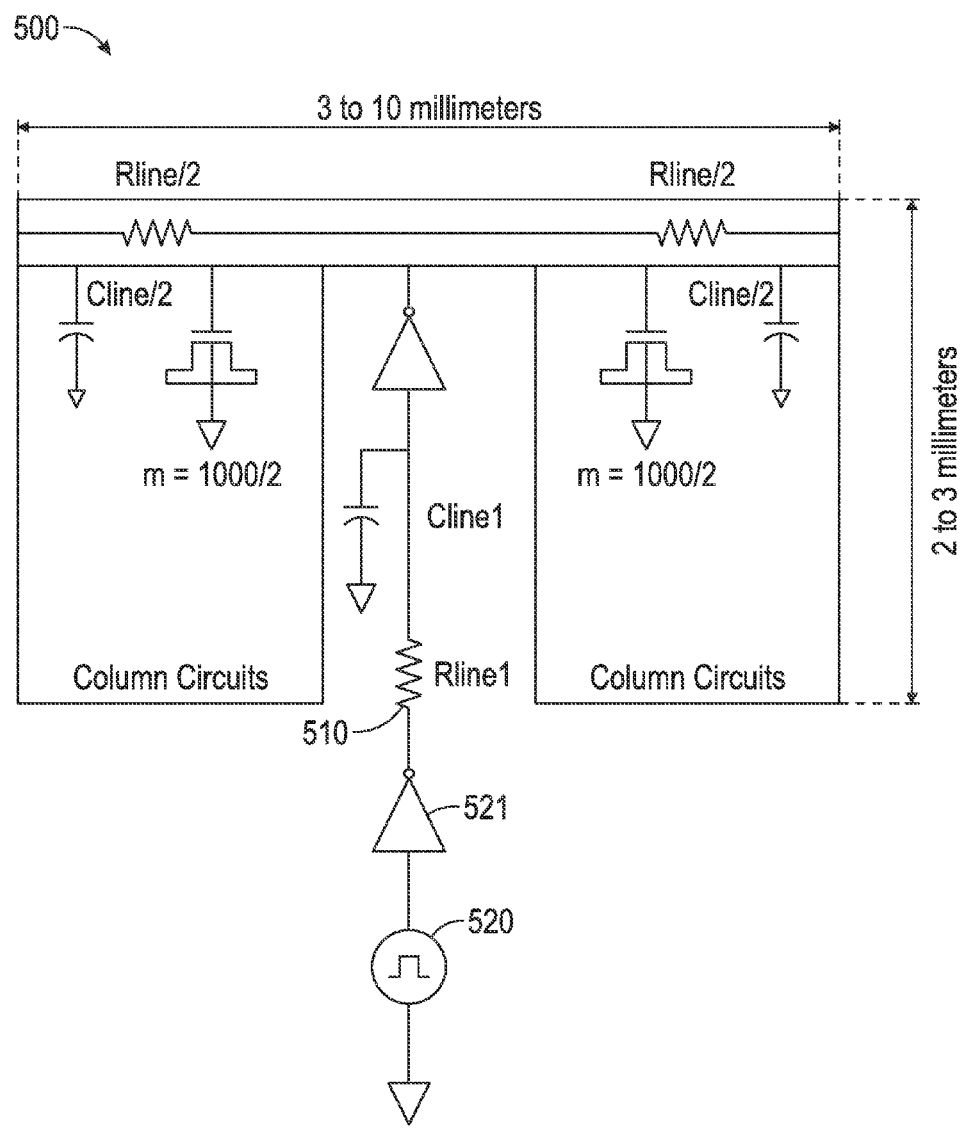
FIG. 5 shows a control signal being driven from the bottom of an array and routed vertically to an intermediate buffer that drives the line of an array.

Subrow control signals are very short in duration. For these, it becomes even more critical to reduce the line RC and loading capacitance to make sure the control signals have little delay and fast rise/fall times. An embodiment reduces the column pitch by a small amount e.g., 0.1 um each. This leaves extra room, so at every 1000 columns, there will be an extra 100 um through which to route control signals. In addition the control signal can be cut every 1000 columns and the channel be formed in the middle of the 1000 columns to further reduce the delay and rise/fall times. FIG. 5 illustrates this situation, where the column circuits 500 are in essence grouped into areas, and a space 510 is left between the column circuits. This space is used for routing the control signals such as the signal 520 routed through the driver 521. FIG. 5 shows how the vertical routing is done in the middle of the array to keep symmetry of the array.

Another benefit of FIG. 5 is that it is fully compatible with a stitch block. According to one embodiment, a stitched block is laid out such that control signals having short pulse widths do not extend across a stitch edge. Edges of the stitch block create the segment cuts or, in the case of the FIG. 4 embodiment, the areas where it is assumed that the control signal will not pass. The column pitch is shrunk by a small amount to leave room for the routing channel 510 in the middle of the stitch block array to drive the digital control signals through.

As part of this, the design can leave 1 to 5 um on the left and right sides of the stitch block so that none of the reduced pitch column layouts will be stitched. This thus avoids the stitching rule. In this scheme, only large metal lines, usually just power and ground will cross the stitch boundary. In most cases this will result in much more flexibility in the column layouts, as the stitching rules can be quite cumbersome.

For matching purposes, dummy columns can be added to the left and right near the stitch edge as well as to the left and right of the channel. This way, active circuits and thin metal lines are far away from the stitch edge couple with having only thick metal lines crossing the stitch edges will result in a more robust design and increasing yield.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other numbers of readout circuits could be used. Moreover, other types of drivers can be used besides those specifically shown.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor can be used to control the operation, or alternatively the operation can be controlled by a controller. The processor may be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A image sensor system, comprising:
a first stitched image sensor part that has multiple image sensing pixels and pixel gates, wherein said multiple pixel gates are connected together by a first line on said first stitched image sensor part, and said multiple pixel gates are controlled by a first control signal, a second stitched image sensor part that also has multiple sensing pixels and pixel gates, and wherein said multiple pixel gates are connected together by a second line on said second stitched image sensor part, and said multiple pixel gates on said second stitched image sensor part are controlled by said first control signal;
a driver for said first control signal, wherein said driver includes a first part for controlling said multiple pixel gates of said first stitched image sensor part and said driver has a second part, also driven by the same first control signal, for controlling said multiple pixel gates of said second stitched image sensor part, wherein said first part and said second part are on opposite sides of an array of said image sensors, and wherein there is a connection break between said first line and said second line.

2. The system as in claim 1, wherein said first line and said second line are connected together at stitch boundaries.

3. The system as in claim 1, wherein said first part and said second part are connected at edges of the stitched image sensor part.

4. A image sensor system, comprising:
a circuit array, said circuit array comprising:
a large array of circuits arranged in columns, each circuit containing control logic gates, wherein said control logic gates are connected together by a first line in said circuit array, and said control logic gates are controlled by a first control signal; and
a driver for said first control signal, wherein said driver includes a first part for controlling said control logic gates of said circuit array, wherein said first part and said second part are on opposite sides of an array of said image sensors, and wherein there is a connection break between said first line and said second line.

5. A image sensor system, comprising:
a first circuit array, said first circuit array comprising:
a large array of circuits arranged in columns, each circuit containing control logic gates, wherein said control logic gates are connected together by a first line in said circuit array, and said control logic gates are controlled by a first control signal; a second circuit array, said second circuit array comprising:
a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for controlling said multiple control logic gates of said first circuit array and said driver has a second part, also driven by the same first control signal, for controlling said control logic gates of said second circuit array, wherein said first part and said second part are on opposite sides of said first circuit array and said second circuit array, and said first line has a break between said second line.

6. The system as in claim 5, wherein said first circuit array and said second circuit array are positioned next to one another.

7. The system as in claim 5, wherein said first part and said second part are on opposite sides of said first circuit array and said second circuit array, and said first line will connect across with said second line.

8. The system as in claim 5, further comprising: a third part driver drives said first control signal to said first part and said second part.

9. A image sensor system, comprising:
a first circuit array, said first circuit array comprising:
a large array of circuits arranged in columns, each circuit containing control logic gates, wherein said control logic gates are connected together by a first line in said circuit array, and said control logic gates are controlled by a first control signal; a second circuit array, said second circuit array comprising:
a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for controlling said multiple control logic gates of said first circuit array and said driver has a second part, also driven by the same first control signal, for controlling said control logic gates of said second circuit array, wherein said first part is connected at an edge of said first circuit array and drives said first line only, and said second part is connected at an edge of said second circuit array and drives said second line only.

10. A image sensor circuit, comprising:
a first circuit array, said first circuit array comprising:
a large array of circuits arranged in columns, each circuit containing control logic gates, wherein said control logic gates are connected together by a first line in said circuit array, and said control logic gates are controlled by a first control signal;
a second circuit array, said second circuit array comprising:
a large array of circuits arranged in columns, each circuit containing control logic gates, wherein said control logic gates are connected together by a second line in said circuit array, and said control logic gates are controlled by said first control signal;
a first driver for said first control signal, wherein said first driver includes a first part for driving said first control signal to an intermediate driver second part, where said second part controls said multiple control logic gates of said first line; a second driver for said first control signal, wherein said second driver includes a third part for driving said first control signal to an intermediate driver fourth part, where said fourth part controls said multiple control logic gates of said second line, wherein said third part is positioned below said second circuit array and routes said first control signal vertically to said fourth part.

11. The system as in claim 10, wherein said first part is positioned below said first circuit array and routes said first control signal vertically to said second part.

12. The system as in claim 10, wherein said first circuit array and said second circuit array are positioned next to one another.

13. A image sensor circuit, comprising:
a first circuit array, said first circuit array comprising:
a large array of circuits arranged in columns, each circuit containing control logic gates, wherein said control logic gates are connected together by a first line in said circuit array, and said control logic gates are controlled by a first control signal; a second circuit array, said second circuit array comprising:
a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for driving said first control signal to an intermediate driver second part, where said second part controls said multiple control logic gates of said first line; a driver for said first control signal, wherein said driver includes a third part for driving said first control signal to an intermediate driver fourth part, where said fourth part controls said multiple control logic gates of said second line, wherein said third part is positioned below said second circuit array and routes said first control signal vertically to said fourth part.

14. A image sensor circuit, comprising:
a first circuit array, said first circuit array comprising:
a large array of circuits arranged in columns, each circuit containing control logic gates, wherein said control logic gates are connected together by a first line in said circuit array, and said control logic gates are controlled by a first control signal, a second circuit array, said second circuit array comprising:
a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for driving said first control signal to an intermediate driver second part, where said second part controls said multiple control logic gates of said first line; a driver for said first control signal, wherein said driver includes a third part for driving said first control signal to an intermediate driver fourth part, where said fourth part controls said multiple control logic gates of said second line, wherein said first line and said second line are disconnected.

15. A image sensor circuit, comprising:
a first circuit array, said first circuit array comprising:
a large array of circuits arranged in columns, each circuit containing control logic gates, wherein said control logic gates are connected together by a first line in said circuit array, and said control logic gates are controlled by a first control signal;
a second circuit array, said second circuit array comprising:
a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for driving said first control signal to an intermediate driver second part, where said second part controls said multiple control logic gates of said first line; a driver for said first control signal, wherein said driver includes a third part for driving said first control signal to an intermediate driver fourth part, where said fourth part controls said multiple control logic gates of said second line, wherein said first line and said second line are connected.

16. A stitched image sensor circuit, comprising:
a first stitched circuit array, said first stitched circuit array comprising:
a large array of circuits arranged in columns, each circuit containing control logic gates, wherein said control logic gates are connected together by a first line in said circuit array, and said control logic gates are controlled by a first control signal; a second stitched circuit array, said second stitched circuit array comprising:
a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for controlling said multiple control logic gates of said first stitched circuit array and said driver has a second part, also driven by the same first control signal, for controlling said multiple control logic gates of said second stitched circuit array, wherein said first part and said second part are on opposite sides of said first stitched circuit array and said second stitched circuit array, and said first line has a break between said second line at stitch boundaries.

17. The system as in claim 16, wherein said first stitched circuit array and said stitched second circuit array are positioned next to one another.

18. The system as in claim 16, wherein said first part and said second part are on opposite sides of said first stitched circuit array and said second stitched circuit array, and said first line connects across with said second line.

19. The system as in claim 16, further comprising: a third part driver will drive said first control signal to said first part and said second part.

20. A stitched image sensor circuit, comprising:
a first stitched circuit array, said first stitched circuit array comprising:
a large array of circuits arranged in columns, each circuit containing control logic gates, wherein said control logic gates are connected together by a first line in said circuit array, and said control logic gates are controlled by a first control signal; a second stitched circuit array, said second stitched circuit array comprising:
a large array of circuits arranged in columns, each circuit containing control logic gates, wherein said control logic gates are connected together by a second line in said circuit array, and said control logic gates are controlled by said first control signal a driver for said first control signal, wherein said driver includes a first part for controlling said multiple control logic gates of said first stitched circuit array and said driver has a second part, also driven by the same first control signal, for controlling said multiple control logic gates of said second stitched circuit array, wherein said first part is connected at edge of said first stitched circuit array and drives said first line only, and said second part is connected at edge of said second stitched circuit array and drives said second line only.

21. A stitched image sensor circuit, comprising:
a first stitched circuit array, said first stitched circuit array comprising:
a large array of circuits arranged in columns, each circuit containing control logic gates, wherein said control logic gates are connected together by a first line in said circuit array, and said control logic gates are controlled by a first control signal; a second stitched circuit array, said second stitched circuit array comprising:
a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for driving said first control signal to an intermediate driver second part, where said second part controls said multiple control logic gates of said first line; a driver for said first control signal, wherein said driver includes a third part for driving said first control signal to an intermediate driver fourth part, where said fourth part controls said multiple control logic gates of said second line.

22. The system as in claim 21, wherein said first part is positioned below said first stitched circuit array and routes said first control signal vertically to said second part.

23. The system as in claim 21, wherein said third part is positioned below said second stitched circuit array and routes said first control signal vertically to said fourth part.

24. The system as in claim 21, wherein said first stitched circuit array and said stitched second circuit array will be positioned next to one another.

25. An image sensor system, comprising:
a first circuit array, said first circuit array comprising: a large array of circuits arranged in columns, each circuit containing control logic gates, wherein said control logic gates are connected together by a first line in said circuit array, and said control logic gates are controlled by a first control signal; a second circuit array, said second circuit array comprising: a large array of circuits arranged in columns, each circuit containing control logic gates, wherein said control logic gates are connected together by a second line in said circuit array, and said control logic gates are controlled by said first control signal; a driver for said first control signal, wherein said driver includes a first part for controlling said multiple control logic gates of said first circuit array and said driver has a second part, also driven by the same first control signal, for controlling said control logic gates of said second circuit array, wherein said first line and said second line will be disconnected at stitch boundaries.

26. An image sensor system, comprising:
a first circuit array, said first circuit array comprising: a large array of circuits arranged in columns, each circuit containing control logic gates, wherein said control logic gates are connected together by a first line in said circuit array, and said control logic gates are controlled by a first control signal;
a second circuit array, said second circuit array comprising: a large array of circuits arranged in columns, each circuit containing control logic gates, wherein said control logic gates are connected together by a second line in said circuit array, and said control logic gates are controlled by said first control signal;
a driver for said first control signal, wherein said driver includes a first part for controlling said multiple control logic gates of said first circuit array and said driver has a second part, also driven by the same first control signal, for controlling said control logic gates of said second circuit array, wherein said first line and said second line will be connected across stitch boundaries.

* * * * *